US011661500B2

(12) United States Patent
Papakonstantopoulos et al.

(10) Patent No.: US 11,661,500 B2
(45) Date of Patent: May 30, 2023

(54) SILICA REINFORCED RUBBER COMPOSITION CONTAINING A MULTI-FUNCTIONAL GROUP FUNCTIONALIZED ELASTOMER AND TIRE WITH TREAD

(71) Applicant: The Goodyear Tire & Rubber Company, Akron, OH (US)

(72) Inventors: George Jim Papakonstantopoulos, Medina, OH (US); Aaron Patrick Murray, Chardon, OH (US); Bruce Raymond Hahn, Hudson, OH (US); Teresa Diane Martter, Akron, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 217 days.

(21) Appl. No.: 16/507,093

(22) Filed: Jul. 10, 2019

(65) Prior Publication Data
US 2020/0095403 A1 Mar. 26, 2020

Related U.S. Application Data

(60) Provisional application No. 62/734,407, filed on Sep. 21, 2018.

(51) Int. Cl.
| | |
|---|---|
| *B60C 1/00* | (2006.01) |
| *C08K 3/04* | (2006.01) |
| *C08K 3/36* | (2006.01) |
| *C08K 5/372* | (2006.01) |
| *C08K 5/5415* | (2006.01) |
| *C08L 15/00* | (2006.01) |
| *C08K 5/548* | (2006.01) |
| *C08C 19/25* | (2006.01) |

(52) U.S. Cl.
CPC ............ *C08L 15/00* (2013.01); *B60C 1/0016* (2013.01); *C08K 3/04* (2013.01); *C08K 3/36* (2013.01); *C08K 5/372* (2013.01); *C08K 5/548* (2013.01); *C08K 5/5415* (2013.01); *C08C 19/25* (2013.01)

(58) Field of Classification Search
CPC .......... C08C 19/25; C08C 19/20; C08C 19/28
See application file for complete search history.

(56) References Cited

U.S. PATENT DOCUMENTS

| | | | |
|---|---|---|---|
| 3,485,857 A | 12/1969 | Speier | |
| 3,705,882 A | 12/1972 | Skillicorn | |
| 4,721,749 A * | 1/1988 | Odar | B60C 1/0016 524/526 |
| 4,935,471 A | 6/1990 | Halasa et al. | |
| 5,128,416 A | 7/1992 | Imai et al. | |
| 5,219,938 A | 6/1993 | Imai et al. | |
| 5,652,310 A | 7/1997 | Hsu et al. | |
| 5,663,396 A * | 9/1997 | Musleve | C07F 7/1892 556/427 |
| 6,008,295 A | 12/1999 | Takeichi et al. | |
| 6,228,908 B1 | 5/2001 | Takeichi et al. | |
| 7,335,706 B1 | 2/2008 | Halasa et al. | |
| 7,714,089 B2 | 5/2010 | Halasa et al. | |
| 7,847,019 B2 | 12/2010 | David et al. | |
| 7,906,593 B2 | 3/2011 | Halasa et al. | |
| 8,071,689 B2 | 12/2011 | Halasa et al. | |
| 8,124,704 B2 | 2/2012 | Oshima et al. | |
| 8,217,103 B2 | 7/2012 | Thiele et al. | |
| 8,324,329 B2 | 12/2012 | Luo et al. | |
| 8,916,665 B2 | 12/2014 | Lawson et al. | |
| 8,993,669 B2 | 3/2015 | Nebhani et al. | |
| 9,206,277 B2 | 12/2015 | Tanaka | |
| 9,255,158 B2 | 2/2016 | Lawson et al. | |
| 9,260,540 B1 | 2/2016 | Yan | |
| 9,315,608 B2 | 4/2016 | Fujii et al. | |
| 9,441,098 B1 | 9/2016 | Isitman et al. | |
| 9,458,253 B2 | 10/2016 | Döring et al. | |
| 9,574,032 B2 | 2/2017 | Choi et al. | |
| 9,676,874 B2 | 6/2017 | Lawson et al. | |
| 9,884,923 B2 | 2/2018 | Lawson et al. | |
| 2006/0241241 A1 | 10/2006 | Yan et al. | |
| 2006/0247360 A1 | 11/2006 | Halasa et al. | |
| 2009/0247696 A1 | 10/2009 | Fujii et al. | |
| 2010/0056711 A1 | 3/2010 | Fujii et al. | |
| 2013/0066008 A1 | 3/2013 | Lawson et al. | |

(Continued)

FOREIGN PATENT DOCUMENTS

| | | |
|---|---|---|
| JP | 2001302704 A | 10/2001 |
| WO | WO2017015592 A1 * | 1/2017 |
| WO | WO2017184814 A1 * | 10/2017 |

OTHER PUBLICATIONS

European Search Report dated Feb. 28, 2020 for application No. 1919923.7.

*Primary Examiner* — Irina S Zemel
*Assistant Examiner* — Jeffrey S Lenihan
(74) *Attorney, Agent, or Firm* — Mandy B. Willis; John D. DeLong

(57) ABSTRACT

This invention relates to a rubber composition containing filler reinforcement comprised of precipitated silica with silica coupling agent therefore and conjugated diene-based elastomer which contains end-chain functionalization with multi-functional groups. The groups functionalizing the elastomer are multi-functional in the sense of containing one group reactive with at least one of said precipitated silica and silica coupling agent and another different group reactive with diene-based elastomers through sulfur cure of the rubber composition. A sulfur cured rubber composition containing said end-chain functionalization is provided. A tire is provided having a component comprised of said rubber composition. Representative of said tire component is a tire tread.

13 Claims, No Drawings

(56) References Cited

U.S. PATENT DOCUMENTS

| | | |
|---|---|---|
| 2013/0158185 A1 | 6/2013 | Thompson |
| 2013/0296481 A1 | 11/2013 | Tanaka |
| 2014/0135437 A1 | 5/2014 | Sandstrom et al. |
| 2016/0312028 A1* | 10/2016 | Hogan ................... C08C 19/44 |
| 2017/0283516 A1 | 10/2017 | Lawson et al. |

* cited by examiner

SILICA REINFORCED RUBBER COMPOSITION CONTAINING A MULTI-FUNCTIONAL GROUP FUNCTIONALIZED ELASTOMER AND TIRE WITH TREAD

FIELD OF THE INVENTION

This invention relates to a rubber composition containing filler reinforcement comprised of precipitated silica with silica coupling agent therefore and conjugated diene-based elastomer which contains end-chain functionalization with multi-functional groups. The groups functionalizing the elastomer are multi-functional in the sense of containing one group reactive with at least one of said precipitated silica and silica coupling agent and another different group reactive with diene-based elastomers through sulfur cure of the rubber composition. A sulfur cured rubber composition containing said end-chain functionalization is provided. A tire is provided having a component comprised of said rubber composition. Representative of said tire component is a tire tread.

BACKGROUND OF THE INVENTION

Tires are often desired for improved performances with their tire treads providing a significant role. Such improved performances may include one or more of beneficial tread properties such as road traction, resistance to abrasion to promote resistance to tread wear, and reduction in rubber hysteresis to promote reduction in internal heat generation during tire service with expected beneficial reduction in tire rolling resistance with an associated beneficial increase in vehicular fuel economy.

For such purpose, it is desired to evaluate providing a precipitated silica reinforced rubber composition for such tire tread which contains an end-chain multi-functional group functionalized diene-based elastomer.

In the description of this invention, the terms "compounded" rubber compositions and "compounds" are used to refer to rubber compositions which have been compounded, or blended, with appropriate rubber compounding ingredients. The terms "rubber" and "elastomer" may be used interchangeably unless otherwise indicated. The amounts of materials are usually expressed in parts of material per 100 parts of rubber by weight (phr).

SUMMARY AND PRACTICE OF THE INVENTION

In accordance with this invention, a rubber composition is provided comprised of:

(A) at least one conjugated diene-based elastomer, and (B) filler reinforcement comprised of a combination of precipitated silica and rubber reinforcing carbon black, wherein at least one of said conjugated diene-based elastomers is comprised of a diene-based elastomer end-functionalized with a multi-functional group.

Such multi-functional end groups are exclusive of alkoxyorganomercaptosilanes and alkoxyaminosilanes.

In accordance with this invention, a multi-functional end-chain group functionalized conjugated diene-based elastomer comprised of at least one conjugated diene elastomer containing at least one end-chain (terminal) multi-functional group is provided wherein said multi-functional group is comprised of at least one of:

(A) an alkoxyorganosilane polysulfide of general formula (I):

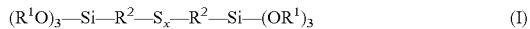

$(R^1O)_3$—Si—$R^2$—$S_x$—$R^2$—Si—$(OR^1)_3$ (I)

wherein $R^1$ represents the same or different aliphatic hydrocarbon radicals containing from 1 to 12 carbon atoms, $R^2$ represents an aliphatic hydrocarbon containing from 1 to 8 carbon atoms and x represents a value of from 1 to and including 8; and (B) an unsaturated alkoxyorganosilane of the general formula (II):

$(R^1O)_3$—Si—$R^3$ (II)

wherein $R^1$ represents the same or different aliphatic hydrocarbon radicals containing from 1 to 12 carbon atoms, and $R^3$ represents an unsaturated hydrocarbon containing from 2 to 100, alternately from 2 to 10, carbon atoms.

In one embodiment, at least one of said $R^1$ radicals of at least one of said formula (I) and formula (II) is an ethyl radical.

Such alkoxyorganosilane of general formula (II) may be considered as having a degree of unsaturation of from about 1 to about 100, alternately from about 1 to about 10.

In one embodiment, said multi-functional end-chain functionalized conjugated diene-based elastomer is comprised of a mixture of end-chain functionalized and non-functionalized elastomer chains wherein at least 50, alternately from about 50 to about 90, percent of said elastomer chains of said mixture are said end-chain functionalized elastomer.

In one embodiment said multi-functional group functionalized elastomer is comprised of a plurality of elastomer chains terminated by the same multi-functional group.

In one embodiment, representative of said alkoxyorganosilane polysulfide (of general formula (I)) is, for example, bis(3-trialkoxysilylalkyl) polysulfide having an average of from about 2 to about 5, alternately from about 2 to about 2.6, and alternately from about 3.4 to about 4.1 connecting sulfur atoms in its polysulfidic bridge. Representative of said bis(3-trialkoxysilylalkyl) polysulfide is a bis(3-triethoxysilylpropyl) polysulfide.

In one embodiment, representative of said alkoxyorganosilanes (of formula II) are, for example, vinyltrimethoxysilane, vinyltriethoxysilane, vinyltris(2-methoxyethoxysilane), vinyltrisisopropoxysilane, vinyltris(tert-butylperoxy)silane, vinyldimethylethoxysilane, vinylmethyldiethoxysilane.

In one embodiment, representative of said alkoxyorganosilanes (of formula II) are, for example, allyltrimethoxysilane, allyltriethoxysilane, allyltris(2-methoxyethoxysilane), allyltrisisopropoxysilane, allyltris(tert-butylperoxy)silane, allyldimethylethoxysilane, allylmethyldiethoxysilane.

In one embodiment, said conjugated diene-based elastomer containing at least one of said end-chain (terminal) polyfunctional groups is comprised of at least one of polymers of at least one of isoprene and 1,3-butadiene monomers and styrene with at least one of isoprene and 1,3-butadiene monomers.

Representative examples of such conjugated diene-based elastomers are, for example, cis 1,4-polyisoprene elastomers (which may be natural or synthetic elastomers), polybutadiene elastomers (e.g. cis 1,4-polybutadiene elastomers), styrene/butadiene elastomers, isoprene/butadiene elastomers and styrene/isoprene/butadiene elastomers.

In one embodiment, said conjugated diene-based elastomer containing at least one of said end-chain polyfunctional groups may be a polybutadiene elastomer having a low vinyl 1,2-isometric content in a range of from about 5 to about 20 percent and which may be referred to herein as a low vinyl polybutadiene elastomer.

In one embodiment, said conjugated diene-based elastomer containing at least one of said end-chain polyfunctional groups may be a polybutadiene elastomer having a high vinyl 1,2-isometric content in a range of from about 50 to about 80 percent and which may be referred to herein as a high vinyl polybutadiene elastomer.

In further accordance with this invention, said end-chain functionalized diene-based elastomers may be prepared by, and are thereby a product of, anionic catalytic polymerization of at least one of isoprene and 1,3-butadiene monomers, or of styrene with at least one of isoprene and 1,3-butadiene monomers, in an organic solvent where said polymerization is terminated with at least one of alkoxyorganosilane polysulfides represented by general formula (I) and unsaturated alkoxyorganosilanes represented by general formula (II).

Therefore, in one embodiment of this invention said end-chain multi-functional group functionalized (end-terminated) elastomer may be at least one of high cis 1,4-polybutadiene elastomer (e.g. containing at least 90 percent cis 1,4-isometric content), low vinyl 1,2-polybutadiene elastomer, high vinyl 1,2-polybutadiene elastomer, cis 1,4-polyisoprene elastomer and styrene/butadiene elastomer where said elastomer is end-chain functionalized (terminated) with at least one of alkoxyorganosilane polysulfides represented by general formula (I) and unsaturated alkoxyorganosilanes represented by general formula (II).

In one embodiment, said elastomer may be comprised of more than one of its polymer chains terminated with at least one of said multi-functional groups to thereby comprise a multi-functional group functionalized elastomer.

In additional accordance with this invention, a rubber composition is provided which is comprised of (contains), based on parts by weight per 100 parts by weight of rubber (phr): products where said rubber composition contains, based on parts by weight per 100 parts by weight elastomer (phr):

(A) 100 phr of conjugated diene-based elastomers comprised of;
  (1) about 10 to about 90 phr of at least one of said diene-based elastomers containing at least one end-chain (terminal) multi-functional group, and
  (2) about 90 to about 10 phr of at least one additional diene-based elastomer; and
(B) about 40 to about 200 phr of rubber reinforcing filler comprised of a combination of precipitated silica (amorphous synthetic precipitated silica) and rubber reinforcing carbon black, together with silica coupling agent having a moiety reactive with silanol groups on said precipitated silica and another different moiety interactive with said diene-based elastomers, where said multi-functional group is comprised of at least one of alkoxyorganosilane polysulfides represented by general formula (I) and alkoxyorganosilanes represented by general formula (II).

In one embodiment said at least one additional diene based elastomer for said rubber composition is comprised of, for example, at least one of cis 1,4-polyisoprene (natural rubber or synthetic), cis 1,4-polybutadiene, and styrene/butadiene copolymers.

In one embodiment, at least a portion of said precipitated silica is a pre-hydrophobated precipitated silica comprised of a composite comprised of said precipitated silica pre-reacted with silica coupling agent (prior to addition of said composite to said rubber composition).

In one embodiment, said precipitated silica and silica coupling agent may be added to the rubber composition and reacted together in situ within the rubber composition.

The precipitated silica may, for example, be characterized by having a BET surface area, as measured using nitrogen gas, in the range of, for example, about 40 to about 600, and more usually in a range of about 50 to about 300 square meters per gram. The BET method of measuring surface area might be described, for example, in the *Journal of the American Chemical Society*, Volume 60, as well as ASTM D3037.

Various commercially available precipitated silicas may be used, such as, and not intended to be limiting, silicas from PPG Industries under the Hi-Sil trademark with designations 210, 243, 315, etc.; silicas from Solvay with, for example, designations of Zeosil 1165MP and Zeosil 165GR; silicas from Evonik with, for example, designations VN2 and VN3; and chemically treated (pre-hydrophobated) precipitated silicas such as for example Agilon™ 400 from PPG.

Representative examples of rubber reinforcing carbon blacks are, for example, and not intended to be limiting, are referenced in *The Vanderbilt Rubber Handbook*, 13$^{th}$ edition, year 1990, on Pages 417 and 418 with their ASTM designations. As indicated, such rubber reinforcing carbon blacks may have iodine absorptions ranging from, for example, 60 to 240 g/kg and DBP values ranging from 34 to 150 cc/100 g.

Representative of silica coupling agents for the precipitated silica are comprised of, for example;

(A) bis(3-trialkoxysilylalkyl) polysulfide containing an average in range of from about 2 to about 4, alternatively about 2 to about 2,6 and alternately about 3.4 to about 4, connecting sulfur atoms in its polysulfide connecting bridge, or (B) an organoalkoxymercaptosilane, or (C) their combination.

Representative of such bis(3-trialkoxysilylalkyl) polysulfide is comprised of bis(3-triethoxysilylpropyl) polysulfide.

In additional accordance with this invention a tire is provided (e.g. a pneumatic tire) having a component comprised of said rubber composition.

In further accordance with this invention, said tire component is a tire tread.

Therefore, for one embodiment of this invention, a tire is provided having a circumferential rubber tread, said tread having an outer running surface intended to be ground-contacting, where said tread containing said running surface is comprised of said rubber composition.

In practice, said tire tread is provided as a sulfur cured rubber composition.

It is readily understood by those having skill in the art that the vulcanizable rubber composition would be compounded by methods generally known in the rubber compounding art. In addition, said compositions could also contain fatty acid, zinc oxide, waxes, antioxidants, antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Usually it is desired that the sulfur-vulcanizing agent is elemental sulfur. The sulfur-vulcanizing agent may be used in an amount ranging, for example, from about 0.5 to 8 phr, with a range of from 1.2 to 6 phr being often more desirable. Typical amounts of processing aids for the rubber composition, where used, may comprise, for example, from about 1 to about 20 phr. Typical processing aids may be, for example, at least one of various fatty acids (e.g. at least one of palmitic, stearic and oleic acids) or fatty acid salts.

Rubber processing oils may be used, where desired, in an amount of, for example, from about 10 up to about 100, alternately from about 15 to about 45 phr, to aid in processing the uncured rubber composition. The processing oil used may include both extending oil present in the elastomers, and process oil added during compounding. Suitable process oils include various oils as are known in the art, including aromatic, paraffinic, naphthenic, and low PCA oils, such as MES, TDAE, and heavy naphthenic oils, and vegetable oils such as sunflower, soybean, and safflower oils.

Typical amounts of antioxidants may comprise, for example, about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants may comprise, for example, about 1 to 7 phr. Typical amounts of fatty acids, if used, which can include stearic acid comprise about 0.5 to about 10 phr. Typical amounts of zinc oxide may comprise, for example, about 1 to about 5 phr. Typical amounts of waxes comprise about 1 to about 5 phr. Often microcrystalline waxes are used. Typical amounts of peptizers, when used, may be used in amounts of, for example, about 0.1 to about 1 phr. Typical peptizers may be, for example, pentachlorothiophenol and dibenzamidodiphenyl disulfide.

Sulfur vulcanization accelerators are used to control the time and/or temperature required for vulcanization and to improve the properties of the vulcanizate. In one embodiment, a single accelerator system may be used, i.e., primary accelerator. The primary accelerator(s) may be used in total amounts ranging, for example, from about 0.5 to about 7, sometimes desirably about 0.8 to about 3.0, phr. In another embodiment, combinations of a primary and a secondary accelerator might be used with the secondary accelerator being used in smaller amounts, such as, for example, from about 0.0 to about 4 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, sulfenamides, and xanthates. Often desirably the primary accelerator is a sulfenamide. If a second accelerator is used, the secondary accelerator is often desirably a guanidine such as for example a diphenylguanidine.

The mixing of the vulcanizable rubber composition can be accomplished by methods known to those having skill in the rubber mixing art. For example, the ingredients are typically mixed in at least two stages, namely at least one non-productive stage followed by a productive mix stage. The final curatives, including sulfur-vulcanizing agents, are typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 130° C. and 190° C. The appropriate duration of the thermomechanical working varies as a function of the operating conditions and the volume and nature of the components. For example, the thermomechanical working may be from 1 to 20 minutes.

The pneumatic tire of the present invention may be, for example, a passenger tire, truck tire, a race tire, aircraft tire, agricultural tire, earthmover tire and off-the-road tire. Usually desirably the tire is a passenger or truck tire. The tire may also be a radial or bias ply tire, with a radial ply tire being usually desired.

Vulcanization of the pneumatic tire containing the tire tread of the present invention is generally carried out at temperatures in a range of, for example, from about 120° C. to 200° C. Often it is desired that the vulcanization is conducted at temperatures ranging from about 150° C. to 190° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. The parts and percentages are parts by weight, usually parts by weight per 100 parts by weight rubber (phr) unless otherwise indicated.

EXAMPLE I

Preparation of End-chain Multi-functional Group Functionalized Polybutadiene Elastomer In this Example, a butyl-lithium catalyst was used to synthesize an end-chain multi-functional group functionalized relatively low vinyl containing polybutadiene elastomer from 1,3-butadiene monomer.

A bis(3-triethoxysilylpropyl) polysulfide was introduced in an excess amount to thereby terminate the polymerization and to functionalize the terminal chain end of the polybutadiene elastomer.

The end-chain terminated polybutadiene was recovered from the hexane solvent by stream stripping.

The resulting end-functionalized polybutadiene elastomer was comprised of about 40 percent cis 1,4-isometric content, about 50 percent isometric trans 1,4-content, and 10 percent vinyl 1,2-content and was therefore considered to be a low vinyl polybutadiene elastomer. It had a weight average molecular weight (Mw) of about 200,000 and a Mooney (ML1+4), 100° C., viscosity of about 45.

EXAMPLE II

Evaluation of End-chain Multi-functional Group Functionalized Polybutadiene Elastomer in Rubber Composition A control rubber composition was prepared and identified as rubber Sample A as a precipitated silica reinforced rubber composition containing synthetic elastomers as a combination of styrene/butadiene rubber and cis 1,4-polybutadiene rubber.

An experimental rubber composition was prepared as rubber Sample B as a precipitated silica reinforced rubber composition. Experimental rubber Sample B contained precipitated silica reinforced synthetic elastomers and a combination of end-chain multi-functional group functionalized polybutadiene elastomer of Example I together with styrene/butadiene rubber and filler reinforcement comprised of precipitated silica.

The rubber compositions are illustrated in the following Table 1.

TABLE 1

| | Parts by Weight (phr) | |
|---|---|---|
| Material | Control Sample A | Experimental Sample B |
| Styrene/butadiene rubber[1] | 40 | 40 |
| Cis 1,4-Polybutadiene rubber[2] | 60 | 0 |
| End-Chain multi-functional group functionalized low vinyl polybutadiene elastomer[3] | 0 | 60 |
| Rubber processing oil[4] | 20 | 20 |
| Precipitated silica[5] | 65 | 65 |
| Silica coupler[6] | 5.2 | 5.2 |
| Fatty acids[7] | 3 | 3 |
| Carbon black (N330) | 5 | 5 |
| Wax (paraffinic and microcrystalline) | 1.5 | 1.5 |
| Antioxidant | 1.75 | 1.75 |
| Zinc oxide | 1.5 | 1.5 |
| Sulfur | 1.25 | 1.25 |
| Sulfur cure accelerators[8] | 3.25 | 3.25 |

[1]A styrene/butadiene rubber as SLF16S42 from The Goodyear Tire & Rubber Company

[2]High cis 1,4-polybutadiene rubber as BUD1207 having a cis 1,4 content of at least 95 percent

[3]End-chain multi-functional group functionalized low vinyl polybutadiene rubber of Example I

[4]Rubber processing oil as a TDAE type petroleum based oil

[5]Precipitated silica as Zeosil 1165MP ™ from Solvay

[6]Silica coupler comprised of a bis(3-triethoxysilylpropyl) polysulfide containing an average in a range of from about 2 to about 2.6 connecting sulfur atoms in its polysulfidic bridge as Si266 ™ from Evonik

[7]Fatty acids comprised of stearic, palmitic and oleic acids

[8]Sulfur cure accelerators as sulfenamide primary accelerator and diphenylguanidine secondary accelerator The rubber Samples were prepared by blending the ingredients, other than the sulfur curatives, in a first non-productive mixing stage (NP1) in an internal rubber mixer for about 6 minutes to a temperature of about 160° C. The rubber compositions were subsequently mixed in a productive mixing stage (P) in an internal rubber mixer with the sulfur curatives comprised of the sulfur and sulfur cure accelerators for about 3 minutes to a temperature of about 100° C. The rubber compositions were each removed from the internal mixer after each mixing step and cooled to below 40° C. between each non-productive mixing stage and before the final productive mixing stage.

The following Table 2 illustrates cure behavior and various physical properties of rubber compositions based upon the basic formulation of Table 1 and reported herein as Control Sample A and Experimental rubber Sample B. Where cured rubber samples are reported, such as for the stress-strain, rebound and dynamical mechanical properties values, the rubber samples were cured for about 14 minutes at a temperature of about 160° C.

TABLE 2

Evaluation of Rubber Compositions (Rubber Compounds)

| | Parts by Weight (phr) | |
|---|---|---|
| | Control Sample A | Experimental Sample B |
| Material | | |
| Styrene/butadiene rubber | 40 | 40 |
| Cis 1,4-Polybutadiene rubber | 60 | 0 |
| End-chain multi-functional group functionalized low vinyl polybutadiene elastomer (of Example I) | 0 | 60 |
| Properties | | |
| RPA[1], cured storage modulus G' at 10% strain, 1 Hertz, 60° C., kPa | 3258 | 3483 |
| RPA tan delta at 10% strain, 1 Hertz, 60° C. (lower is better) | 0.139 | 0.122 |
| Rebound at 100° C., percent (higher is better) | 62.8 | 66.9 |
| Rebound at 23° C., percent (higher is better) | 51.4 | 54.1 |
| Rebound at 0° C., percent | 40 | 39 |
| Elongation at break (%) | 582 | 574 |
| Modulus 300% (MPa) | 6.8 | 6.9 |

[1]Rubber Process Analyzer

From Table 2 it is observed that sulfur cured Experimental rubber compound Sample B demonstrates a beneficially lower hysteresis as evidenced by both of a lower tan delta value of 0.122 and a higher rebound at 100° C. of 66.9 percent in comparison to the Control rubber compound Sample A having a higher tan delta value of 0.139 and a significantly lower rebound value of 62.8 percent. This shows a beneficial reduction (an improvement) of the hysteresis of the compound (rubber composition), Sample B, resulting from the utilization of the multi-functional group functionalized polybutadiene elastomer which is indicative of providing a beneficial reduction in rolling resistance for a vehicular tire having a tread of such rubber composition and a resulting beneficial reduction of fuel consumption of an associated vehicle.

It is concluded that it has been discovered that an inclusion of the end-chain multi-functional group functionalized polybutadiene elastomer has resulted in a beneficial effect for the hysteresis of the rubber composition.

EXAMPLE III

Preparation of End-chain Multi-functional Group Functionalized High Vinyl Polybutadiene Rubber and Evaluation of Said Elastomer in Rubber Composition A 60 gallon (227 liter capacity) agitator containing jacketed reactor, having been dried and flushed with nitrogen, was charged with 210 pounds (95 kg) of a pre-dried 11.1 weight percent 1,3-butadiene monomer solution in hexane. During agitation, the solution temperature was increased to 135° F. (57° C.) by application of heat to the reactor jacket.

To the agitated heated solution in the reactor was added 17.5 ml of TMEDA (tetramethylenediamine as a polymerization modifier) and 30 ml of dry hexane followed by addition of 36.6 ml of 15 weight percent n-butyl lithium polymerization catalyst (as a polymerization initiator) in hexane.

The temperature of the solution in the reactor was allowed to increase to 152° F. (67° C.), and after 1.5 hours, the content of the reactor was slowly transferred to a second vessel that had been pre-charged with 82.5 ml of bis (3-triethoxysilylpropyl) polysulfide which contained a range of about 2 to 2.6 connecting sulfur atoms in its poly-sulfidic bridge.

After 20 minutes of ageing, a polymerization stopping agent was added to stop the polymerization. The mixture was agitated for an additional 15 minutes to allow for the polymerization to discontinue.

The resulting polymer product as an end-functionalized polybutadiene elastomer recovered by removing the hexane by steam stripping.

The recovered product was a functionalized high Tg, high vinyl, polybutadiene elastomer determined to have a Tg of about −33° C. and a vinyl 1,2-isomeric content of about 70 percent with end-functional groups provided by the polymerization initiator.

The final polymer (polybutadiene elastomer) had a weight average molecular weight (Mw) of about 200,000 and a Mooney (ML1+4), 100° C., viscosity of about 45.

An Experimental rubber composition was prepared as rubber Samples D as a precipitated silica reinforced rubber composition. Experimental rubber Sample D contained precipitated silica reinforced synthetic elastomers as a combination of said end-chain functionalized high vinyl polybutadiene rubber (of this Example III) and filler reinforcement comprised of precipitated silica.

The rubber compositions are illustrated in the following Table 3.

TABLE 3

Formulation Used for Evaluation

| | Parts by Weight (phr) | |
| --- | --- | --- |
| Material | Control Sample C | Experimental Sample D |
| Cis 1,4-Polybutadiene rubber[1] | 20 | 20 |
| Non functionalized high vinyl polybutadiene[2] | 80 | 0 |
| Multi-functional group functionalized high vinyl polybutadiene elastomer (from this Example III)[3] | 0 | 80 |
| Rubber processing oil[4] | 20 | 20 |
| Precipitated silica[5] | 65 | 65 |
| Silica coupler[6] | 6.5 | 6.5 |
| Fatty acids[7] | 3 | 3 |
| Carbon black (N330) | 5 | 5 |
| Wax (paraffinic and microcrystalline) | 1.5 | 1.5 |
| Antioxidant | 2.5 | 2.5 |
| Zinc oxide | 2 | 2 |
| Sulfur | 1.5 | 1.5 |
| Sulfur cure accelerators[8] | 3.5 | 3.5 |

[1]High cis 1,4-polybutadiene rubber as BUD1207 ™ from The Goodyear Tire & Rubber Company having a cis 1,4-content of at least 95 percent
[2]Non functionalized high vinyl polybutadiene synthesized in the same manner as the end-chain multi-functional group functionalized polybutadiene of this Example II without the end-functionalization step having a vinyl content of about 70 percent.
[3]End-chain multi-functional group functionalized high vinyl polybutadiene rubber of this Example III.
[4]Rubber processing oil as a TDAE type petroleum based oil
[5]Precipitated silica as Zeosil 1165MP ™ from Solvay
[6]Silica coupler comprised of a bis(3-triethoxysilylpropyl) polysulfide containing an average in a range of from about 2 to about 2.6 connecting sulfur atoms in its polysulfidic bridge as Si266 ™ from Evonik
[7]Fatty acids comprised of stearic, palmitic and oleic acids
[8]Sulfur cure accelerators as sulfenamide primary accelerator and diphenylguanidine secondary accelerator The rubber Samples were prepared by blending the ingredients, other than the sulfur curatives, in a first non-productive mixing stage (NP1) in an internal rubber mixer for about 6 minutes to a temperature of about 160° C. The rubber compositions were subsequently mixed in a productive mixing stage (P) in an internal rubber mixer with the sulfur curatives comprised of the sulfur and sulfur cure accelerators for about 3 minutes to a temperature of about 100° C. The rubber compositions were each removed from the internal mixer after each mixing step and cooled to below 40° C. between each non-productive mixing stage and before the final productive mixing stage.

The following Table 4 illustrates cure behavior and various physical properties of rubber compositions based upon the basic formulation of Table 3 and reported herein as Control Sample C and Experimental rubber Sample D. Where cured rubber samples are reported, such as for the stress-strain, rebound and dynamical mechanical properties values, the rubber samples were cured for about 14 minutes at a temperature of about 160° C.

TABLE 4

Evaluation of rubber compositions (rubber compounds)

| | Parts by Weight (phr) | |
| --- | --- | --- |
| | Control Sample C | Experimental Sample D |
| Material | | |
| Cis 1,4-Polybutadiene rubber | 20 | 20 |
| Non functionalized high vinyl polybutadiene | 80 | 0 |
| End-chain multi-functional group functionalized high vinyl polybutadiene (from this Example III) | 0 | 80 |
| Properties | | |
| RPA[1], cured storage modulus G' at 10% strain, 1 Hertz, 60° C., kPa | 1998 | 1958 |
| RPA tan delta at 10% strain, 1 Hertz, 60° C. (lower is better) | 0.106 | 0.089 |
| Rebound at 100° C., percent (higher is better) | 66.8 | 71.7 |
| Rebound at 23° C., percent (higher is better) | 44.8 | 48.8 |
| Rebound at 0° C., percent | 11.2 | 9.4 |
| Elongation at break (%) | 426 | 379 |
| Modulus 300% (MPa) | 9.3 | 11.3 |

[1]Rubber Process Analyzer

From Table 4 it is observed that cured experimental compound D demonstrates a beneficially lower hysteresis as evidenced by both of a lower tan delta value of 0.089 and a higher rebound at 100° C. of 71.7 percent in comparison to the Control rubber compound A having a higher tan delta value of 0.106 and lower rebound value of 66.8 percent. This shows a beneficial reduction (an improvement) of the hysteresis of the compound (rubber composition) resulting from the utilization of the multi-functional group functionalized elastomer which is indicative of providing a beneficial improvement in rolling resistance for a vehicular tire having a tread of such rubber composition and a resulting beneficial reduction of fuel consumption of an associated vehicle.

It is concluded that it has been discovered that an inclusion of the end-chain multi-functional group functionalized polybutadiene elastomer has resulted in a beneficial effect of providing a lower hysteresis of the rubber composition.

While certain representative embodiments and details have been shown for the purpose of illustrating the invention, it will be apparent to those skilled in this art that various changes and modifications may be made therein without departing from the spirit or scope of the invention.

What is claimed is:
1. A rubber composition comprised of:
(A) at least one conjugated diene-based elastomer comprising at least one of a high vinyl and low vinyl polybutadiene;
(B) filler reinforcement for said rubber composition comprised of a combination of precipitated silica and rubber reinforcing carbon black, together with silica coupling agent having a moiety reactive with silanol groups on said precipitated silica and another different moiety interactive with said diene-based elastomers, wherein at least one conjugated diene-based elastomer is an end-chain functionalized diene-based elastomer, wherein the end-chain functionalized conjugated diene-based elastomer is a reaction product, absent an intermediary, of a diene elastomer terminated with an alkoxyorganosilane polysulfide comprised of the general formula:

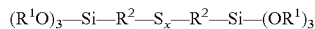

$(R^1O)_3$—Si—$R^2$—$S_x$—$R^2$—Si—$(OR^1)_3$ wherein R1 represents the same or different aliphatic hydrocarbon radicals containing from 1 to 12 carbon atoms, R2 represents an aliphatic hydrocarbon containing from 1 to 8 carbon atoms and x represents a value of from 1 to and including 8 such that the polysulfide has an average of from about 2 to about 2.6 connecting sulfur atoms in its polysulfidic bridge; and wherein the multi-functional groups are exclusive of alkoxyorganomercaptosilanes and alkoxyaminosilanes.

2. The rubber composition of claim 1 comprised of
(A) 100 phr of conjugated diene-based elastomers comprised of:
 (1) about 10 to about 90 phr of a diene-based elastomer containing at least one end-chain multi-functional group of comprised of an alkoxyorganosilane polysulfide of claim 1, and
 (2) about 90 to about 10 phr of at least one additional diene-based elastomer; and
(B) about 40 to about 200 phr of the rubber reinforcing filler.

3. The rubber composition of claim 2 wherein, for said end-chain multi-functionalized elastomer, said end-chain group is a bis(3-trialkoxysilylalkyl) polysulfide.

4. The rubber composition of claim 3 wherein, for said end-chain multi-functional elastomer, at least one of said $R^1$ radicals of said bis(3-trialkoxysilylalkyl) polysulfide is an ethyl radical.

5. The rubber composition of claim 4 wherein, for said end-chain multi-functional elastomer, said alkoxyorganosilane polysulfide is a bis(3-triethoxysilylpropyl) polysulfide.

6. The rubber composition of claim 1 wherein, for said end-chain multi-functional elastomer, at least one of said $R^1$ radicals of said alkoxyorganosilane polysulfide is an ethyl radical.

7. The rubber composition of claim 1 wherein, for said end-chain multi-functional elastomer, said conjugated diene-based elastomer containing at least one of said end-chain polyfunctional groups is comprised of at least one of polymers of at least one of isoprene and 1,3-butadiene monomers and of styrene with at least one of isoprene and 1,3-butadiene monomers.

8. The rubber composition of claim 1, wherein said elastomers are comprised of a mixture of end-chain functionalized and non-functionalized elastomers wherein at least 50 percent of said elastomers of said mixture are said end-chain functionalized elastomer.

9. The rubber composition of claim 1 further comprising, based on parts by weight per 100 parts by weight of rubber (phr):
(A) 100 phr of conjugated diene-based elastomers comprised of;
 (1) about 10 to about 90 phr of at least one of diene-based elastomer containing at least one end-chain multi-functional group comprised of an alkoxyorganosilane polysulfide of claim 1, and
 (2) about 90 to about 10 phr of at least one additional diene-based elastomer exclusive of styrene containing elastomers, and
(B) about 40 to about 200 phr of rubber reinforcing filler comprised of a combination of precipitated silica and rubber reinforcing carbon black, together with silica coupling agent having a moiety reactive with silanol groups on said precipitated silica and another different moiety interactive with said diene-based elastomers.

10. The rubber composition of claim 1 wherein said end-chain multi-functional elastomer is comprised of a plurality of elastomer chains terminated by the same multi-functional group.

11. The rubber composition of claim 1 wherein said rubber composition is a sulfur cured rubber composition.

12. A tire having a component comprised of the rubber composition of claim 1 wherein said rubber composition is a sulfur cured rubber composition.

13. The tire of claim 12 wherein said component is a tire tread.

* * * * *